United States Patent [19]

Fujimoto

[11] Patent Number: 4,711,051
[45] Date of Patent: Dec. 8, 1987

[54] NESTABLE MINI-GREENHOUSE APPARATUS

[76] Inventor: Sachi M. Fujimoto, 901 Raton Ave., La Junta, Colo. 81050

[21] Appl. No.: 926,743

[22] Filed: Nov. 4, 1986

[51] Int. Cl.[4] .............................................. A01G 9/00
[52] U.S. Cl. ...................................... 47/17; 47/28 R; 47/30
[58] Field of Search ................... 47/26, 28, 32, 30, 17; 135/100, 116, 118; 220/367

[56] References Cited

U.S. PATENT DOCUMENTS

| Re. 30,531 | 3/1981 | Spector | 47/28 |
| 1,820,040 | 8/1931 | Zuckerman | 47/28 |
| 2,141,485 | 12/1938 | Piglia | 47/28 |
| 3,226,881 | 1/1966 | Garrett | 47/30 |
| 3,939,607 | 2/1976 | Spector | 47/28 R |
| 3,995,396 | 12/1976 | Spector | 47/28 |
| 4,132,457 | 1/1979 | Parrish et al. | 47/28 R |
| 4,291,494 | 9/1981 | Knablein et al. | 47/28 |
| 4,304,068 | 12/1981 | Beder | 47/28 |
| 4,392,326 | 7/1983 | Boria | 47/28 R |

Primary Examiner—Robert A. Hafer
Assistant Examiner—Bradley M. Lewis
Attorney, Agent, or Firm—Henderson & Sturm

[57] ABSTRACT

A mini-greenhouse apparatus (10) suitable for indoor or outdoor use; wherein, the apparatus comprises: a tapered transparent receptacle member (14); an anchor unit (13) engageable with the larger end (14") of the receptacle member; and, a cap unit (12) adapted to cooperate in three different modes; with an enlarged central aperture (17) formed in the smaller end (14') of the receptacle member; and, whereby like mini-greenhouse apparatus components cooperate with one another in a nesting fashion.

3 Claims, 5 Drawing Figures

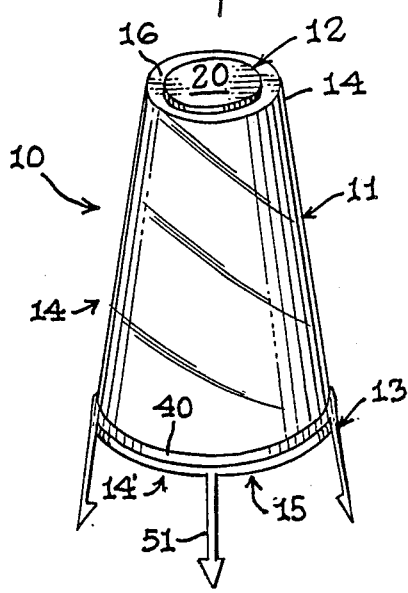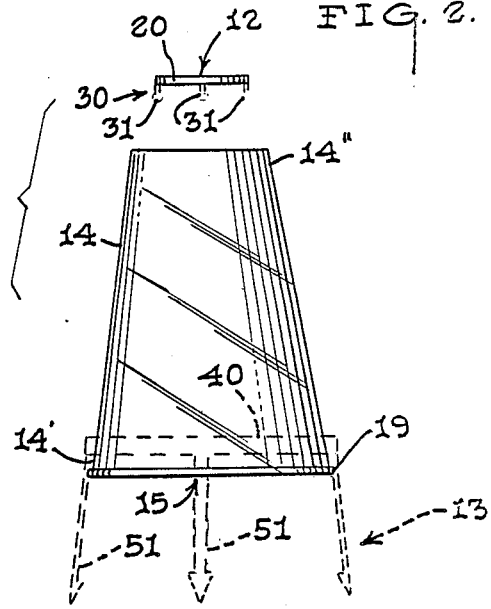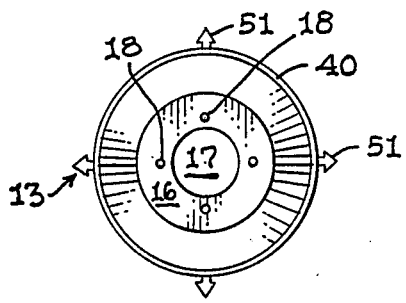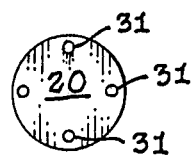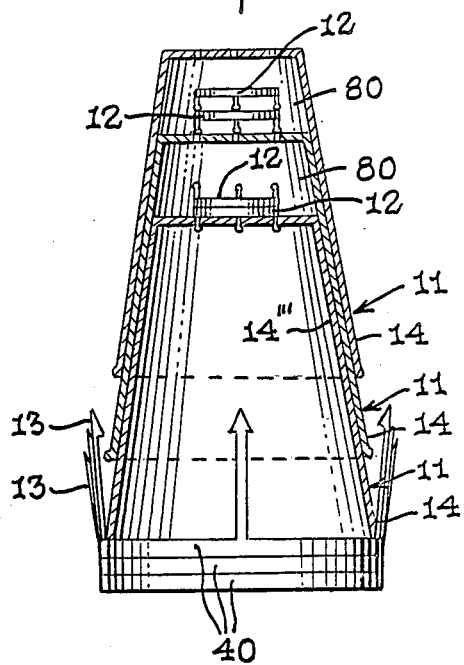

NESTABLE MINI-GREENHOUSE APPARATUS

TECHNICAL FIELD

The present invention relates generally to the field of greenhouse or terrarium structures.

BACKGROUND OF THE INVENTION

The prior art is replete with myriad and diverse terrarium and greenhouse constructions, examples of which may be seen by reference to the following U.S. Pat. Nos: 4,291,494; 4,304,068; 3,939,607; and, 3,995,396.

While all of the aforementioned prior art constructions are more than adequate for their intended purpose and function; they are uniformally deficient in a number of individual and shared respects.

Briefly stated, most of the prior art constructions are only suited for use in an indoor or in an outdoor environment; and they are normally not designed for use in both environments.

It should also be noted that: while some of the prior art devices are bulky and cumbersome to use; others are fragile and delicate and require careful handling; and, still others require inflation and/or stiffening members in order to suspend or support a dome element above the bedding plants.

Yet other prior art constructions include a dome and receptacle arrangement; wherein, one or the other, or both of the primary components may be used individually for different specific purposes, and used in combination to fulfill a common purpose.

Given the myriad constructions, designs, and intended functions and purposes that are represented in the prior art patents, it is amazing that new, innovative, and versatile devices are being introduced into the marketplace every year.

SUMMARY OF THE INVENTION

The present invention represents a totally unique approach to the field of terrarium and greenhouse constructions in that: the three main components of the design were developed along the lines of knock down nesting modules; wherein the three main components of each module are capable of nesting with themselves either in the assembled or disassembled mode.

The three main components of the mini-greenhouse of this invention comprise: an enclosure unit; a cap unit; and, an anchor unit; wherein, the enclosure unit represents the primary structure around which the mini-greenhouse evolves.

Briefly stated, the mini-greenhouse of this invention is suitable for use in both an indoor and an outdoor environment. In addition, each of the main components are fabricated from durable material; whereby, the mini-greenhouse will provide a long useful life for the casual or professional gardener.

Furthermore, the main components of this invention interact with one another; whereby, the gardener may pick and choose which arrangement will best suit his or her particular needs at a given time and under certain circumstances.

First of all it is to be understood that the minigreenhouse of this invention was developed for use with either potted plants or young garden plants. As a consequence the anchor unit would only be employed with the enclosure unit in an indoor environment where there were young children or pets that could damage the plants. In the outdoor use of the mini-greenhouse the anchor unit would almost always be employed.

The cap unit cooperates with the enclosure unit to produce a removable closure element for the enclosure unit; wherein, water and plant food can be administered to the plants by removing the cap unit; and, in an alternate mode of deployment the cap unit may be partially engaged with the enclosure unit to provide ventilation for the plants, while still protecting the plants from the direct effect of strong winds and heavy rain.

BRIEF DESCRIPTION OF THE DRAWINGS

These and other objects, advantages, and novel features of the invention will become apparent from; the detailed description of the best mode for carrying out the preferred embodiment of this invention which follows; particularly when considered in conjunction with the accompanying drawings, wherein:

FIG. 1 is a perspective view of the mini-greenhouse of this invention;

FIG. 2 is an exploded perspective view of the main components;

FIG. 3 is a top plan view of the enclosure unit and anchor unit in their assembled disposition;

FIG. 4 is a top plan view of the cap unit; and,

FIG. 5 is a cross-sectional view showing the nesting cooperation between the components of minigreenhouse modules.

BEST MODE FOR CARRYING OUT THE INVENTION

As can be seen by reference to the drawings, and in particular to FIG. 1, the mini-greenhouse apparatus that forms the basis of the present invention is designated generally by the reference numeral (10). The mini-greenhouse apparatus (10) comprises in general an enclosure unit (11) a cap unit (12) and an anchor unit (13). These units will now be described in seriatim fashion.

As shown in FIGS. 1 thru 3, the enclosure unit (11) comprises a tapered cylindrical receptacle member (14) having an enlarged opening (15) defining the larger end (14') of the receptacle member (14); and whose smaller end (14") is defined by a shoulder element (16) which surrounds an enlarged central aperture (17).

In addition, the shoulder element (16) is further provided with a plurality of smaller apertures (18), which surround the periphery of the enlarged central aperture (17); and, the larger end (14') of the receptacle member (14) is further provided with a lip element (19) which surrounds the enlarged opening (15).

As can best be seen by reference to FIGS. 1, 2, and 4, the cap unit (12) comprises a generally circular cap member (20) whose diameter is greater than the diameter of the enlarged central aperture (17) of the receptacle member (14). In addition, the cap member (20) is further provided with releasable engagement means (30) in the form of a plurality of deformable stem elements (31) that are dimensioned to cooperate with the plurality of smaller apertures (18) surrounding the enlarged aperture (17) for releasably securing the cap unit (12) to the receptacle unit (11).

At this juncture it should be noted that the cap unit (12) has three modes of disposition relative to the receptacle unit (11). These modes of disposition are: fully retracted; partially engaged; and fully engaged.

In the fully retracted mode depicted in FIG. 3, the enlarged central aperture (17) is totally exposed; so that water and plant food may be introduced into the interior of the receptacle unit (11).

In the partially engaged mode (shown in phantom in FIG. 2), the cap member (20) is supported above the enlarged central aperture (17) a distance equivalent to the height of the unengaged portions of the deformable stem elements (31). In this mode, the interior of the receptacle member (14) is exposed to ventilation provided by the ambient air currents surrounding the receptacle unit (11); while, also being provided with a cover element that will prevent the direct entry of heavy precipitation into the interior of the receptacle member.

In the fully engaged mode depicted in FIG. 1, the cap member (20) is brought into mating contact with the shoulder element (16) of the receptacle member (14); wherein, the interior of the receptacle unit (14) is effectively sealed at the smaller end (14") of the receptacle member (14).

As shown in FIGS. 1, 2, and 5, the anchor unit (13) comprises a collar element (40) provided with ground penetrating means (50); wherein, the ground penetrating means (50) comprises a plurality of downwardly depending spike elements (51); and, wherein the spike elements (51) are angled slightly outwardly with respect to the collar element (40).

As can best be appreciated by reference to FIGS. 1 thru 3, the inside diameter of the collar element (40) is approximately equal to, but less than, the outside diameter of the lip element (19) on the receptacle member (14); whereby the anchor unit may be inserted over the smaller end (14') and brought into engagement with the rear of the lip element (19) on the larger end (14") of the receptacle member to anchor the receptacle unit (11) into the soil.

As mentioned previously, the mini-greenhouse apparatus (10) of this invention was developed based on the modular component nesting concept; wherein, at least the majority of the major modular components were capable of nesting with themselves and with other of the modular components; whereby a plurality of the mini-greenhouses could be disassembled into their respective components, and the plurality of respective components joined together in a non-operational storage mode.

As can be seen particularly by reference to Fig. 5, in the storage mode a plurality of mini-greenhouses (10) can occupy only slightly more storage space than would be required to store a single mini-greenhouse (10). Each of the receptacle units (11) can assume a nesting relationship with one another; and, each of the anchor units (13) can assume a nesting relationship: not only with one another; but, also with respect to a selected one of the receptacle units (11); and, the anchor units (13) may be disposed in either a downwardly pointing, or upwardly pointing direction with respect to the selected receptacle unit (11) upon which the anchor units (13) rest.

As is also shown in FIG. 5, the cap units (12) may be stored in the fully engaged mode with respect to their associated receptacle member (11); or, a plurality of cap units may be stored in one of the interior chambers (80) created when a plurality of receptacle units (11) assume a nesting relationship.

In the preferred embodiment of this invention heretofore described, all of the major components (i.e. the receptacle unit (11; the cap unit (12); and the anchor unit (13)) are fabricated from a hard plastic or the like. In addition, it is further contemplated that at least a portion of the receptacle member walls (14''') will be fabricated from a transparent plastic that will allow sunlight to enter the interior of the receptacle member (14) for well recognized reasons.

A mini-greenhouse apparatus (10) built in accordance with the principles disclosed herein will produce a greenhouse apparatus: that is suitable for use in both indoor and outdoor environments: that may be deployed in either an anchored or unanchored mode in either environment; that may be deployed with the cap unit totally disengaged, partially engaged, or fully engaged; and, which may be disassembled into its respective components and stored with other like components in a nesting relationship that will occupy the smallest possible storage space.

Having thereby described the subject matter of this invention it should be obvious that many substitutions, modifications and variations of the invention are possible in light of the above teachings. It is therefore to be understood that the invention as taught and described herein, is only to be limited to the extent of the breadth and scope of the appended claims.

What is claimed is:

1. A mini-greenhouse apparatus for use in both an indoor environment with potted plants and an outdoor environment with fertile garden soil; wherein, the apparatus consists of:

a receptacle unit comprising a tapered receptacle member having an enlarged opening formed on one end, and an enlarged central aperture formed on its other end; wherein, said one end of said tapered receptacle comprises the larger end which is further provided with an outwardly projecting lip element which surrounds the enlarged opening; and, said other end of said tapered receptacle member comprises the smaller end which is provided with a shoulder element which surrounds the enlarged central aperture, wherein said shoulder element is further provided with a plurality of smaller apertures which surround the periphery of said enlarged central aperture;

a cap unit comprising a cap member having a diameter that is greater than the diameter of said enlarged central aperture on the smaller end of the receptacle member; wherein the cap member is provided with a plurality of deformable stem elements which are dimensioned to cooperate with said plurality of apertures on the shoulder element of the receptacle member; whereby, the cap unit may be disposed with respect to the enlarged central aperture in the receptacle member in a selected one of the following modes of disposition: totally disengaged partially engaged; and, fully engaged; and, an anchor unit comprising a collar element provided with a plurality of downwardly depending ground penetrating spike elements; wherein, the inside diameter of said collar element is approximately equal to, but less than, the outside diameter of the lip element on said receptacle member; whereby, the anchor unit may optionally engage the collar element of said receptacle unit in either a ground penetrating mode or a storage mode.

2. The apparatus of claim 1, in combination with another apparatus as described in claim 1; wherein: the receptacle units of both apparatus are dimensioned to engage one another in a nesting fashion; and, the anchor units of both apparatus are dimensioned to engage a selected one of the receptacle units in nesting fashion.

3. The apparatus of claim 1; wherein, at least a portion of the receptacle member is fabricated from a transparent material.

* * * * *